Feb. 15, 1944.     E. C. MOSS     2,342,059
CLAMPING DEVICE
Filed Feb. 17, 1942     2 Sheets-Sheet 1
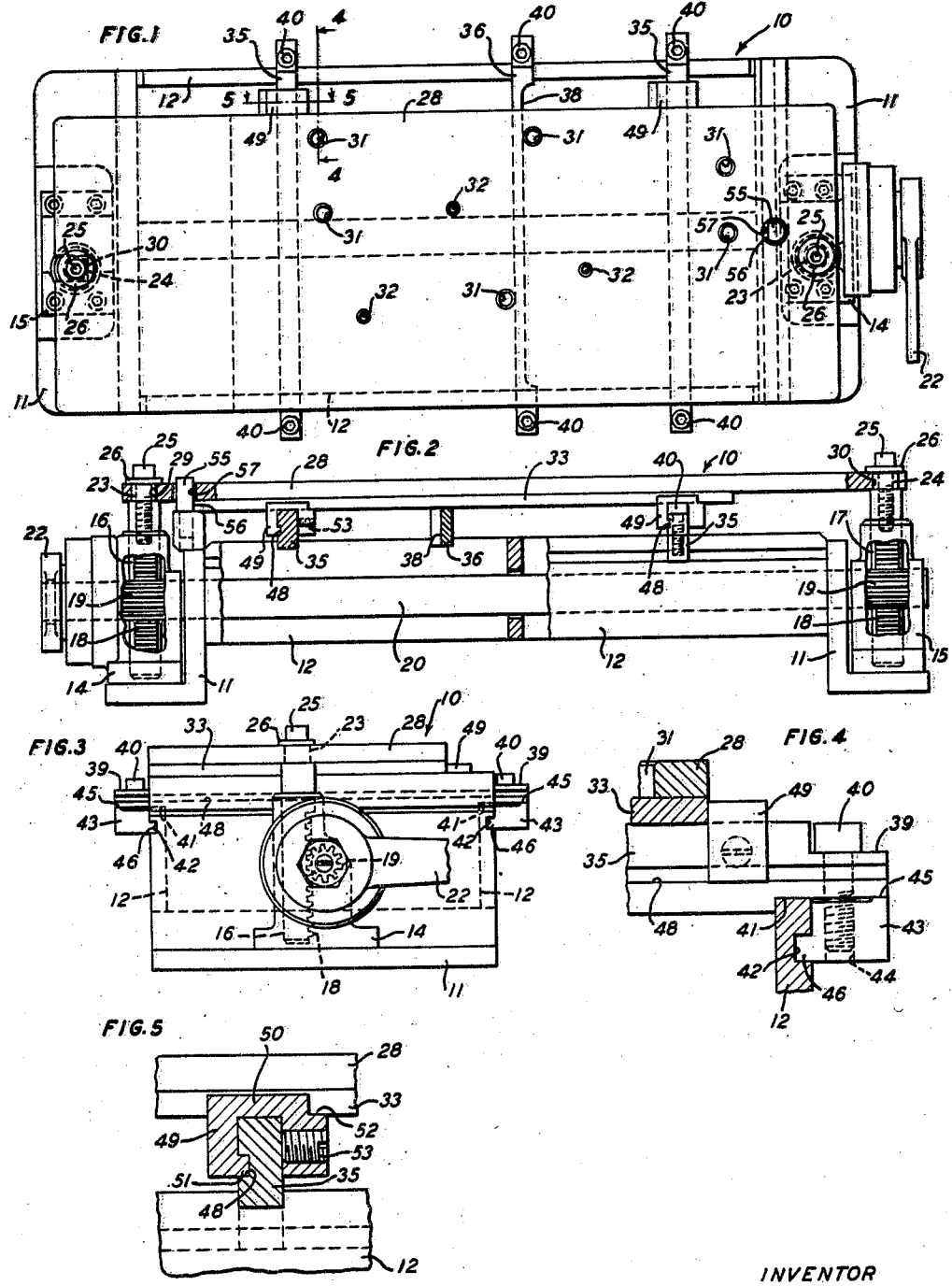
INVENTOR
E. C. MOSS
BY
E. R. Nowlan
ATTORNEY Feb. 15, 1944.  E. C. MOSS  2,342,059
CLAMPING DEVICE
Filed Feb. 17, 1942  2 Sheets-Sheet 2

INVENTOR
E. C. MOSS
BY
E. R. Nowlan
ATTORNEY

Patented Feb. 15, 1944

2,342,059

UNITED STATES PATENT OFFICE 2,342,059

CLAMPING DEVICE

Earl C. Moss, Westfield, N. J., assignor to Western Electric Company, Incorporated, New York, N. Y., a corporation of New York Application February 17, 1942, Serial No. 431,201

10 Claims. (Cl. 77—62)

This invention relates to clamping devices, and more particularly to work clamping devices for drill jigs.

With the use of jig plates having varying layouts of holes through which drills pass in drilling work, it has been the general practise to have such jig plates mounted with the work by the aid of bolts or screws which must be actuated each time it is desired to change the work or jig plate.

An object of the invention is to provide a clamping device which is simple in structure readily operable, and universal in its adaptability for use in combination with jig plates with various hole layouts.

With this and other objects in view, the invention comprises a frame adapted for the variable mounting of supporting bars and having an actuable unit to readily clamp and release, at will, a jig plate and work on the bars, the bars being provided with work stops readily variable to locate the work and also being formed to be located between closely positioned holes of the various plates.

Other objects and advantages will be apparent from the following detailed description when considered in conjunction with the accompanying drawings, wherein Fig. 1 is a top plan view of the clamping device illustrating the positioning of the parts thereof for one type of jig plate;

Fig. 2 is a front elevational view of the structure shown in Fig. 1;

Fig. 3 is an end elevational view of the structure shown in Fig. 1;

Fig. 4 is an enlarged fragmentary sectional view taken along the line 4—4 of Fig. 1;

Fig. 5 is an enlarged fragmentary sectional view taken along the line 5—5 of Fig. 1;

Figure 6:
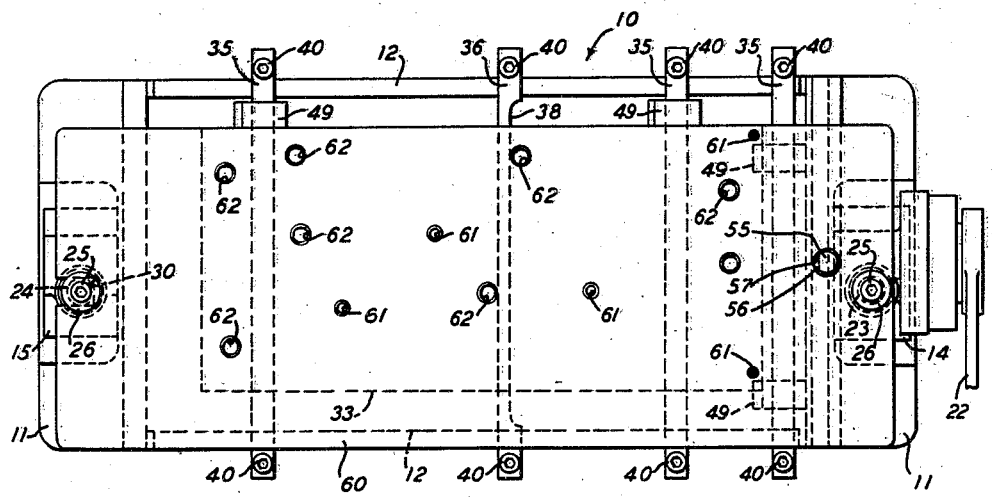
Fig. 6 is a top plan view of the clamping device showing the parts arranged for another type of jig plate.

Referring now to the drawings, attention is first directed to Figs. 1 to 5 inclusive. The clamping device as illustrated in these figures, includes a hollow frame, indicated generally at 10 and including angular ends 11 joined to parallel sides 12. Actuable units 14 and 15 are mounted respectively upon the ends 11 and include housings for reciprocable elements 16 and 17 respectively, these elements having teeth 18 which interengage teeth 19 of the adjacent ends of a shaft 20. The shaft 20 is suitably journaled in the casing of the units 14 and 15 and has a hand crank 22 mounted on one end thereof. The reciprocable elements 16 and 17 extend through openings in their respective casing and have reduced ends 23 and 24, respectively, which are formed for the mounting of a jig plate through the aid of screws 25 and washers 26.

A jig plate 28, of the type shown in Figs. 1 and 2, has an aperture 29 at one end to readily receive the adjacent end 23 of the element 16, while a slot 30 is formed at the opposite end in the jig plate to receive the end 24 of the element 17. Through this means the jig plate may readily be mounted. In the present instance the jig plate 28 has a plurality of holes 31 and 32, the purpose of these holes being to guide drills of a drill press to given locations in work 33. It will be noted that the holes 31 are larger than the holes 32, this illustration being given for a purpose hereinafter described. The material 33 is supported by a desired number of supporting bars 35 and 36, the number of these bars required for each jig plate depending upon the sizes and/or thickness of the work, the material of which the work is composed, the rigidity of the work, and the location of the holes in the jig plate relatively to the edges of the work. If the work is thin and resilient or brittle, it is necessary that the work be supported adjacent the holes of the jig to eliminate movement or other disturbance of the work during the drilling operation as a result of the pressure of the drills on the work.

In the present illustration in Figs. 1 and 2, three supporting bars have been selected, two of the 35 type and one of the 36 type. The only difference in structure of the supporting bars of these types lies in the cross sectional dimensions thereof between their ends; for example, the supporting bars 35 are of the same width throughout their length, whereas the supporting bars 36, only one of which is shown, are reduced between their ends as at 38. The ends of all the bars are identical in structure, they being reduced, as at 39 (Fig. 4), and apertured to receive screws 40. The bars are also reduced, as at 41, to receive either side 12 of the frame 10, as illustrated in Fig. 4. The sides 12 of the frame are grooved longitudinally, as at 42, the grooves in each side being parallel with each other and being disposed in the outer surfaces of the sides. Furthermore, the grooves 42 extend the full length of each side. Clamping lugs 43, of the contour shown in Fig. 4, have threaded apertures 44 therein to receive the screws 40. One clamping lug 43 is provided for each end of each of the supporting bars, to cooperate with their respective screw 40 for the clamping of the supporting bars in selected positions on the frame. The upper surface of each of the lugs has a raised portion 45 to abut against the under surface of its respective supporting bar, while the inner surfaces have integral tongue portion 46 receivable in either groove 42. The threaded connection between the screw 40 and the lug 43 in each instance is sufficiently loose to permit tilting of the lug about the raised portion 45, as a fulcrum, to bring about a sufficient clamping engagement between the lug, the respective side 12, and its respective supporting bar. Furthermore, with this structure it is possible upon loosening the screw 40, to condition the supporting bar for adjustment longitudinally of the frame relative to the jig plate 28 or for its entire removal from the frame and the mounting of it in another location on the frame without removing the lugs.

The supporting bars 35 have longitudinal grooves 48 extending the full length thereof, to receive locating elements 49 of the cross sectional contour illustrated in Fig. 4. It will be noted that the locating elements 49, which are identical in structure, surround the adjacent upper portion of the supporting bars 35, providing an upper portion 50 extending above the supporting bars, an inwardly projecting portion 51 receivable in the grooves 48, and a supporting surface or shoulder 52 lying in a plane with the upper surface of the bar. The purpose of the surface 52 will be more fully described upon consideration of the embodiment of the invention illustrated in Figs. 6 and 7. Suitable means, such as screws 53, is provided to secure each locating element 49 in a desired position on its respective supporting bar. Another locating structure, namely a locating member 55, is rigidly mounted in the frame as illustrated in Fig. 2. This member is, in the present embodiment, in the form of a pin, with a reduced end disposed with a force fit in an aperture in the frame, the upper portion thereof having a flat surface 56 against which the work 33 may be disposed for location relative to the holes in the jig plate. An aperture 57 is provided in the jig plate for the locating member 55, making it possible for the member to project upwardly a sufficient distance from the frame in serving to locate the work when the jig plate is in its upper or loading position. This completes the structure of this embodiment.

In conditioning the clamping device for use the problem to consider first is the type of the material to be worked and the work to be performed thereon, the latter being determined from size and location of the holes in the jig plate to be employed. Upon studying the jig plate, the operator may readily determine the required number of supporting bars necessary for the work in performing the drilling operations. In the present instance the operator has selected three supporting bars, two of the 35 type and one of the 36 type. Therefore, the operator may place these supporting bars approximately in the positions they are to assume, leaving the clamping lugs 43 loose. The locating elements 49 may be free of the supporting bars 35 or loosely mounted thereon near the rearmost ends of the bars. The jig plate is then mounted on the ends of the elements 16 and 17. It is known that in the machining of jig plates or jig structures, the locations of the holes, such as the holes 31 and 32, are determined by accurate measurements taken from two finished surfaces or edges of the jig plate or other structure. In the present embodiment one of these surfaces is the rearmost edge of the jig plate. Therefore, by utilizing the knowledge of this fact the operator may accurately position the locating elements 49 on their supporting bars, after the supporting bars are mounted in place, by moving the locating elements until they are in engagement with the adjacent finished edge of the jig plate and then assuring their locations in these positions by tightening their respective set screws 53. If the holes 31 and 32 in the jig plate are few in number and spaced sufficient distances apart only supporting bars 35 need be used and they may be selectively spaced between the locations of the holes. However, if the holes in the jig plate are grooved, or disposed in close parallel planes, the use of one or more supporting bars 36 is desirable, as this type of supporting bar is narrower and may be disposed between holes as illustrated in Fig. 1. Another important feature of this type of supporting bar is that its position may be reversed if desired due to the fact that both ends of the bar are identical and either end may be secured to either side 12 of the frame. Therefore, with the two types of bars support for the work may be varied depending upon the locations of the holes in the jig plate, to hold the work against movement or bending during the drilling process. It will be noted that the supporting bars 35 are disposed greater distances from their adjacent holes than is the positioning of the supporting bar 36 with respect to its adjacent holes, but here again the nature of the material must be taken into consideration so as to place the support in each instance where it will serve most efficiently to eliminate bending of the material during the drilling operations.

After the jig plate has been mounted, the supporting bars located and clamped in place, and the locating elements 49 brought into engagement with the adjacent surface of the jig plate and locked in place, the device is then ready for operation. It may be disposed upon the table of a drill press, the horizontal portions of the side 12 supporting the entire structure on the table, where it may be moved to bring the selected holes of the jig plate into alignment with the drills of the drill press during the successive stages of the drilling operation. However, before the drilling operation begins the work 33 must be disposed in place. This is brought about through the actuation of the hand crank 22 in a direction to cause the jig plate to be moved upwardly. During rotation of the hand crank 22 the shaft 20 is rotated, causing simultaneous upward movement of the reciprocating elements 16 and 17 to move the jig plate carried thereby upwardly away from the supporting bars 35 and 36. The work 33 may then be moved onto the supporting bars in a diagonal direction to cause one end thereof to engage the locating member 55 and the rearmost edge of the work to engage both locating elements 49. When this has been accomplished the operator releases the work and actuates the hand crank 22 in a direction to effect movement of the jig plate downwardly to clamp the work on the supporting bars. The device remains in this closed position during the entire drilling steps, after which the jig plate may be moved into its open position for the removal of the work.

Figure 7:
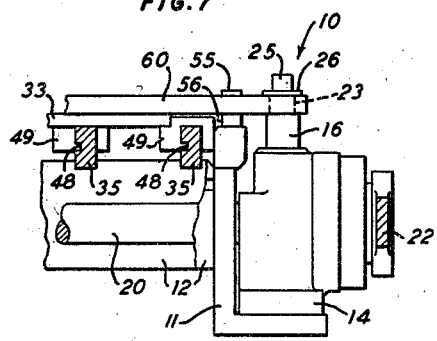
Fig. 7 is a fragmentary front elevational view of the structure shown in Fig. 6.

Upon considering the embodiment of the invention illustrated in Fig. 6, bear in mind that the entire structure shown therein excepting the jig plate, which is identified by reference numeral 60, together with the number and arrangement of the supporting bars 35 and 36 and their respective locating elements, is the same in every detail to the structure illustrated in Figs. 1 to 5 inclusive. This embodiment illustrates different functions of the supporting bars and the locating elements. In this illustration certain of the holes are to be drilled in the work adjacent one of the ends thereof. With the fixed locating member mounted on the frame 10 as illustrated in Fig. 1, it is difficult to give adequate support to the work adjacent the edges or ends thereof when holes are to be drilled in these areas. Here attention is directed to the surfaces or supporting shoulders 52 of the locating elements which, as hereinbefore described, lie in planes with the upper surface of the supporting bars. The use of the locating member 55 may not be effective in this instance, as the holes to be drilled in this material would extend over the adjacent end 11 of the frame. This difficulty has been eliminated, however, by the mounting of two locating elements 49 on one of the supporting bars 35 and mounting them so that their surfaces 52 will support the work adjacent the holes indicated at 61. The elements may be locked in place by their set screws 53 and the respective supporting bar may be secured to the sides 12 through the aid of the screws 40 and the lugs 43. Other supporting bars 35 and 36 may be employed, as illustrated in Fig. 6, to further support the work relative to the other holes 62. In this embodiment it will be apparent that the first mentioned locating elements 49 serve not only as supports for the work but as locating elements cooperating with the other locating elements on the other supporting bars in accurately locating the work relative to the jig plate. The jig plate 60 may be identical in structure to the jig plate 28 excepting for the size and locations of the holes therein, its mounting on the sleeves 23 being of the same structure as that of the jig plate 28.

Although specific improvements of the invention have been shown and described it will be understood that they are but illustrative and that various modifications may be made therein without departing from the scope and spirit of this invention as defined by the appended claims.

What is claimed is:

1. A clamping device in combination with a jig plate having drill guiding holes therein, the device comprising a hollow frame, members to support the jig plate in a given position relative to the frame, supporting bars adapted to be mounted at selected variable positions on the frame out of alignment with the holes in the jig plate to support work to be drilled, and an element to locate the work on the bars relative to the jig plate and adapted for movement on one of the bars into engagement with an edge of the jig plate for accurate positioning of the locating element.

2. A clamping device in combination with a jig plate having drill guiding holes therein, the device comprising a hollow frame, members to support the jig plate in a given position relative to the frame, bars to support work relative to the jig plate, and means adapted to secure the bars at selected variable positions on the frame out of alignment with the holes in the jig plate.

3. A clamping device in combination with a jig plate having drill guiding holes therein, the device comprising a hollow frame, members to support the jig plate in a given position relative to the frame, bars to support work relative to the jig plate, and clamping lugs formed for clamping engagement with the frame to cause mounting of the bars at selected variable positions on the frame out of alignment with the holes in the jig plate.

4. A clamping device in combination with a jig plate having drill guiding holes therein, the device comprising a hollow frame, members to support the jig plate in a given position relative to the frame, and supporting bars adapted to be mounted at selected variable positions on the frame out of alignment with the holes in the jig plate to support work to be drilled, one of the bars having a reduced portion to adapt the bar to be disposed between closely positioned holes of the jig plate.

5. A clamping device in combination with a jig plate having drill guiding holes therein, the device comprising a hollow frame, members to support the jig plate in a given position relative to the frame, and supporting bars adapted to be mounted at selected variable positions on the frame and having reduced portions to support work between extended centers of closely positioned holes in the jig plate.

6. A clamping device in combination with a jig plate having drill guiding holes therein, the device comprising a hollow frame, members to support the jig plate in a given position relative to the frame, supporting bars adapted to be mounted at selected variable positions on the frame out of alignment with the holes in the jig plate to support work to be drilled, and means to move the members to move the jig plate relative to the bars to cause the jig plate to clamp the work on the bars.

7. A clamping device in combination with a jig plate having drill guiding holes therein, the device comprising a hollow frame, like supporting bars adapted to be mounted at selected variable positions on the frame out of alignment with the holes in the jig plate for supporting work to be drilled, and elements mounted on the bars and adapted for adjustment longitudinally thereof to locate the work on the bars relative to the jig plate.

8. A clamping device in combination with a jig plate having drill guiding holes therein, the device comprising a hollow frame, like supporting bars adapted to be mounted at selected variable positions on the frame out of alignment with the holes in the jig plate for supporting work to be drilled and like elements mounted on the bars and adapted for adjustment longitudinally thereof for the positioning of certain of the elements to serve in locating the work on their respective bars relative to the jig plate, while others of the elements support an edge of the work.

9. A clamping device in combination with a jig plate having drill guiding holes therein, the device comprising a hollow frame, like supporting bars adapted to be mounted at selected variable positions on the frame out of alignment with the holes in the jig plate for supporting work to be drilled and like elements mounted on the bars and adapted for adjustment longitudinally thereof for the positioning of certain of the elements to serve in locating the work on their respective bars relative to the jig plate, while others of the elements support an edge of the work and assist in locating the work relative to the jig plate.

10. A clamping device in combination with a jig plate having drill guiding holes therein, the device comprising a hollow frame, like supporting bars adapted to be mounted at selected variable positions on the frame out of alignment with the holes in the jig plate for supporting work to be drilled, an element mounted on one of the bars and adapted for adjustment longitudinally thereof to locate the work on its bar relative to the jig plate, and a member adjustably mounted on another bar and adapted to support an edge of the work and assist the element in locating the work relative to the jig plate.

EARL C. MOSS.